UNITED STATES PATENT OFFICE.

WILLIAM N. BLAKEMAN, JR., OF NEW YORK, N. Y.

PAINT COMPOUND AND PROCESS OF MAKING THE SAME.

No. 883,518.

Specification of Letters Patent.

Patented March 31, 1908.

Application filed February 17, 1906. Serial No. 301,569.

*To all whom it may concern:*

Be it known that I, WILLIAM N. BLAKEMAN, Jr., a citizen of the United States, and resident of the borough of Manhattan, in the city, county, and State of New York, have invented a new and useful Paint Compound and Process of Making the Same, which invention is fully set forth in the following specification.

The object of this invention is to render available for use, as a basis for paint, those pigments which carry no water in combination and were formerly known as anhydrous, but which may be more accurately designated as pigments containing no hydroxyl.

Pigments which contain no hydroxyl do not form satisfactory saponaceous compounds, have very limited spreading power, and are slow in drying when ground in an oil-vehicle; and, up to the present time, Dutch process white lead, in consequence of its quick formation of a saponaceous compound—due to the hydrated oxid of lead which it carries in combination—has been regarded as the only white pigment available for use as a sole basis for paint.

I have discovered that by incorporating a rancidified fatty agent with commercial linseed oil, or other fatty oil, a vehicle will be formed for all the neutral primary pigments, or pigments which contain no hydroxyl and are deficient in spreading power, so that when such pigments, if not singly yet in combination, are ground therein, a satisfactory compound will be formed between the pigment and the oil, the paint will spread in a smooth, uniform and elastic film and will dry rapidly—in all physical respects equal to the mixture of Dutch lead in linseed oil.

The rancidified fatty agent may be formed from an oil or fat, such as linseed, tung or castor oil; a fatty derivative of an oil or fat, such as oleic acid, olein, stearic acid, stearine; or any other equivalent substance. I prefer to employ linseed oil.

Selecting linseed oil, to illustrate my invention, I first rancidify it, and this may be accomplished by any suitable method. The oil may be exposed in shallow vessels, with broad surfaces to the action of air and light until it has been sufficiently rancidified and indicates by test the presence of five or six per cent. of hydrated fatty acids not found in commercial oil. This method of rancidi-fying is a slow one and I have found that a much quicker and more satisfactory result will be obtained if the oil be hydrated before being rancidified. The hydration of the oil may be effected by placing the oil in a vessel having about one or two per cent. of water distributed on the bottom and exposing this vessel to light and air until the water has been absorbed and combined with the oil; or by suspending the oil in a suitable vessel, over a body of water, with a covering arranged to retain a vaporous atmosphere in contact with the oil; or by placing the oil in a vessel having about one or two per cent. of water distributed on the bottom and then subjecting it to a heat of about 150° Fahr., until all the water has been absorbed and combined with the oil, which will take from 8 to 10 hours, the time depending upon keeping the water in minute contact with the oil by agitation. In practice, I prefer to hydrate the oil by the latter method and then rancidify it by exposing it to air and light.

The oil, before being rancidified and either before or after hydration, may be oxidized by any suitable method of oxidation, such as by heating it on oxidizers; or by submitting it with heat to the action of pure oxygen under pressure; or by passing through it, with heat, thoroughly dried air; or by incorporating with it any highly oxidized body with which it is miscible, such as boiled linseed oil, manganese resinate, elaidinized oil, and the like.

Having formed the rancidified fatty agent, I take about five per cent. thereof, and incorporate it with commercial linseed oil, or other fatty oil, with which it is miscible. The fluidity of such commercial oil will not be appreciably affected by this incorporation, and it will show the presence of from 25/100 to 35/100 of one per cent. of hydrated fatty acids for the entire bulk of oil. The vehicle so formed will be found to render available for use, if not singly yet in combination, all primary pigments which contain no hydroxyl and are deficient in spreading power such as lead carbonate, lead sulfate, lead sulfite, zinco-sulfate of lead, zinc oxid, zinc sulfid, barium sulfate, barium carbonate, calcium carbonate, strontium sulfate, strontium carbonate, and the various combinations of zinc and lead resulting from furnace sublimation and known commercially as sublimed lead, oxysulfate of lead, zinc-lead and other trade designations; and a paint-compound produced by grinding one or more of these pigments in the vehicle described will be found satisfactory in all respects. Thus 100 parts of commercial linseed oil having a rancidified fatty agent combined therewith as above described, when ground with 240 parts of either lead carbonate, lead sulfate, or sublimed lead, or 100 parts of zinc oxid, or 80 parts each of lead sulfate and zinc oxid, and spread as a paint (with the usual quantity of liquid drier) will follow the brush in a smooth and uniform film, in all physical respects equal to white lead in linseed oil, and will dry in from 3 to 5 hours according to climatic conditions. The pigments may be used either singly or in combination as my invention gives spreading power to all of them; but as some of these pigments (the earthy sulfates and carbonates for example) are deficient in opacity, it will be found advantageous to combine therewith a proportion of zinc oxid. For colored paints, the addition of the colored pigment or pigments, will supply the necessary opacity.

Any other oil or fat (animal or vegetable) or a fatty derivative of an oil or fat may be used instead of linseed oil to form the rancidified agent and be rancidified, either with or without hydration or oxidation, by any of the methods above described.

The rancidity of the fatty agent and the proportion of this agent to be incorporated in commercial oil may be varied in practice and will depend largely upon the character of the pigment with which it is to be used. The agent should not be too highly rancidified as then it will be no longer soluble in, or miscible with, commercial oil. The maximum quantity of hydrated fatty acids for the rancidified agent would seem to be according to my experiments, from 8 to 10 per cent., and five per cent. of this rancidified agent when introduced into commercial oil will indicate from 40/100 to 50/100 of one per cent. of hydrated fatty acids for the entire bulk of oil, which will be found sufficient for nearly all the pigments named. The presence of as little as 1/10 of one per cent. of such acids in commercial oil will be found to exert a decided influence, but as much as one per cent. may be found necessary in practice to obtain the best results with some combinations of pigments—a matter which can be easily regulated in practice. For use with zinc pigments the fatty agent should be more highly rancidified than is necessary for lead pigments, or else a larger percentage of the rancidified agent should be used in the oil-vehicle. The rancidity can be regulated by regulating the time of exposure to air and light; and, if desired, a uniform standard of rancidity may be adopted for the agent, and a large or small percentage of this agent be used according to the character of the pigment.

In order to ascertain the rancidity necessary for a particular pigment, the film test may be employed: When about five per cent. of the fatty agent undergoing rancidification is incorporated with 100 parts of commercial linseed oil, and this vehicle is ground with 240 parts of either lead carbonate, lead sulfate, or sublimed lead, with the usual quantity of liquid drier, and being spread as a paint, it follows the brush in a smooth, homogeneous and uniform film, does not run, crack, or craze, and dries in from 3 to 5 hours, the fatty agent may be deemed in a satisfactory state for use as a rancidified agent for the vehicle and pigment used, and the rancidifying process may be arrested.

In order to produce a more energetic action and increase the spreading power of the compound, the pigment may be treated by combining therewith a hydrated metallic or earthy oxid, such as hydroxid of zinc or other hydroxid. From 1 to 5 per cent. of hydroxid may be used, depending upon the character of the pigment, a light or bulky pigment requiring a larger percentage than a dense or heavy one. I prefer to use the hydroxid in the form of "slip" or "pulp," attenuating it in water, incorporating it with the pigment, and then evaporating the water; but the hydroxid may be precipitated upon the pigment at its first formation.

It is to be understood that a pigment, or combination of pigments, may be ground to a paste form with from 5 to 7 per cent., or more if necessary, of an oil-vehicle containing a rancidified fatty agent and this vehicle afterwards attenuated or extended with commercial oil exactly as "white lead ground in oil" is now known to the trade. Such a paste I do not however herein specifically claim; the same being claimed in my application No. 302,986, filed February 26, 1906.

Two or more rancidified agents may be used if desired, and two or more oils, drying or non-drying, may be combined to form the paint-vehicle.

Any suitable drier, such as linseed, tung or other drying oil, or a commercial liquid drier, may be added to the paint.

Heat, pressure and agitation may be employed whenever deemed advisable.

I do not herein claim, by itself, the oil-vehicle herein described, the same being claimed in my application No. 216,568, filed July 14, 1904.

Having thus fully described my invention, I claim.

1. A compound or mixture of a fatty oil; a rancidified agent; and a pigment which contains no hydroxyl and is deficient in spreading power.

2. A compound or mixture of linseed oil; a rancidified agent; and a pigment which contains no hydroxyl and is deficient in spreading power.

3. A compound or mixture of a fatty oil; a rancidified oil; and a pigment which contains no hydroxyl and is deficient in spreading power.

4. A compound or mixture of linseed oil; a rancidified oil; and a pigment which contains no hydroxyl and is deficient in spreading power.

5. A compound or mixture of a fatty oil; an agent, hydrated and rancidified; and a pigment which contains no hydroxyl and is deficient in spreading power.

6. The process herein described, which consists in incorporating a rancidified fatty agent with a fatty oil and then grinding therein a pigment which contains no hydroxyl and is deficient in spreading power.

WM. N. BLAKEMAN, Jr.

Witnesses:
FRANCIS P. REILLY,
MABEL O. FAHNESTOCK.